United States Patent
Park

(10) Patent No.: US 7,099,272 B2
(45) Date of Patent: Aug. 29, 2006

(54) SYNCHRONOUS TRANSPORT MODULE

(75) Inventor: Jae Young Park, Yongin-shi (KR)

(73) Assignee: LG Electronics Inc., Seoul (KR)

( * ) Notice: Subject to any disclaimer, the term of this patent is extended or adjusted under 35 U.S.C. 154(b) by 972 days.

(21) Appl. No.: 10/021,440

(22) Filed: Dec. 19, 2001

(65) Prior Publication Data

US 2002/0075898 A1 Jun. 20, 2002

(30) Foreign Application Priority Data

Dec. 19, 2000 (KR) .............................. P2000-78487

(51) Int. Cl.
*G06F 11/00* (2006.01)
*H04L 12/56* (2006.01)

(52) U.S. Cl. ...................... 370/228; 370/392; 370/469; 370/475

(58) Field of Classification Search ............. 370/395.5, 370/395.7
See application file for complete search history.

(56) References Cited

U.S. PATENT DOCUMENTS

| | | | | |
|---|---|---|---|---|
| 5,508,997 A | * | 4/1996 | Katou | 370/228 |
| 5,978,377 A | * | 11/1999 | Kim et al. | 370/395.71 |
| 6,078,595 A | * | 6/2000 | Jones et al. | 370/503 |
| 6,243,382 B1 | * | 6/2001 | O'Neill et al. | 370/395.52 |
| 6,275,491 B1 | * | 8/2001 | Prasad et al. | 370/389 |
| 6,356,561 B1 | * | 3/2002 | Lau et al. | 370/462 |
| 6,359,858 B1 | * | 3/2002 | Smith et al. | 370/217 |
| 6,430,197 B1 | * | 8/2002 | Park | 370/471 |
| 6,449,655 B1 | * | 9/2002 | Hann et al. | 709/233 |
| 6,452,927 B1 | * | 9/2002 | Rich | 370/395.1 |
| 6,535,522 B1 | * | 3/2003 | Arato et al. | 370/466 |
| 2001/0012288 A1 | * | 8/2001 | Yu | 370/352 |
| 2002/0031132 A1 | * | 3/2002 | McWilliams | 370/401 |

* cited by examiner

*Primary Examiner*—Hassan Kizou
*Assistant Examiner*—Brian Roberts
(74) *Attorney, Agent, or Firm*—Fleshner & Kim, LLP

(57) ABSTRACT

A synchronous transmission module is disclosed, including a UTOPIA interface chip for transmitting UTOPIA level-2 data. A pair of STM interface chips receive UTOPIA level-1 data. A UTOPIA memory converts UTOPIA level-2 data into UTOPIA level-1 data and transfers the UTOPIA level-1 data to one of the pair of STM interface chips, according to a transmission address. A UTOPIA interface control part converts the transmission address, depending on states of the STM interface chips. Therefore, variable duplexing of the plurality of STM interface chips in a board is made possible.

19 Claims, 1 Drawing Sheet

Back ground Art

SYNCHRONOUS TRANSPORT MODULE

BACKGROUND OF THE INVENTION

This application claims the benefit of the Korean Application No. P2000-78487 filed on Dec. 19, 2000, which is hereby incorporated by reference.

1. Field of the Invention

The present invention relates to a synchronous transport module (STM) and, more particularly, to variably simplexing/duplexing multiple STM links.

2. Background of the Related Art

Due to the rapid growth of the multi-media field, a communication network providing digital transmission of a wideband signal, such as a video signal, is in demand. A B-ISDN has been developed to meet this demand. The B-ISDN can meet a variety of service requirements of users, and particularly, the motion picture transmission made available by the B-ISDN has built a foundation for realizing a futuristic dream of an information society.

The B-ISDN requires an asynchronous transport mode (ATM) switching technology, in which ATM fixed length (53 byte) information blocks, called cells, are transferred by an ATDM method. When the ATM is used, an ATM communication device has a standard connection protocol between an ATM layer and a physical layer, providing versatility for different transmission media. Accordingly, even if the physical layer has a variety of forms, it is easy to connect to a Segmentation And Reassembly Sublayer (SAR) layer, if the protocol is followed.

The Universal Test & Operation & Physical Interface for ATM (UTOPIA), a standard interface for connecting the ATM layer and the physical layer, provides a cost saving by defining a common and standardized interface between the ATM layer and the physical layer. Moreover, the UTOPIA interface standard permits use of a first in first out (FIFO) memory between the ATM and the physical layer, which have different speeds, and supports 100 Mbps to 155 Mbps data rates, by a common interface of 8-bit data communication.

The UTOPIA interface standard is classified into application specific classes. A UTOPIA level-1 is based on an 8-bit data transmission and UTOPIA level-2 is based on a 16-bit data transmission.

In general, port duplexing of STM interface chips (or links) in an existing board is fixedly made to particular blocks. State information, such as an alarm signal, for each link is provided to duplex a plurality of links between boards.

A background art port duplexing of STM interface chips will be explained with reference to the attached drawings. FIG. 1 illustrates a block diagram of a background art STM, in which particular blocks are fixedly duplexed.

Referring to FIG. 1, the background art STM is a chip for processing an ATM cell. The STM is provided with a UTOPIA interface chip 16, which is a UTOPIA level-2 interface. The UTOPIA FIFO 14 transfers an ATM cell from the interface chip 16 to the transmission buffer 12, according to a FIFO method. The transmission buffet 12 transmits the ATM cell from the UTOPIA FIFO 14 to one of the STM interface chips 10 and 11, duplexed according to control signals (SOC, TCA, RCA, RXEN, TXEN) and a data signal (8-bit data) in the UTOPIA interface standard.

The STM interface chips 10 and 11 receive the ATM cells from the transmission buffer 12 and transmit externally received ATM cells to the reception buffer 13, at a rate of 155 Mbps. The reception buffer 13 receives the ATM cells from the STM interface chips 10 and 11 and transfers them to the bus-matching FIFO memory 15, according to control signals and data. The bus-matching FIFO 15 converts 8-bit parallel data received from the reception buffer 13 into 16-bit parallel data and transfers the converted data to the UTOPIA interface chip 16.

UTOPIA is an interface standard between a lower layer, like the physical layer supported by the STM interface chip (or link), and an upper layer, like the ATM layer. The UTOPIA level-2 interfaces the ATM layer and 16 physical layers, and UTOPIA level-1 interfaces the ATM layer and the physical layer, in a one-to-one relationship.

The bus-matching FIFO 15 converts 8-bit ATM cell data, received from the STM interface chips 10 and 11 and through the reception buffer 13, into 16-bit ATM cell data and forwards it. The STM interface chips 10 and 11 convert the 8-bit parallel data into a differential signal and transmit the differential signal at 155 Mbps.

The port duplexing operation of FIG. 1 will be explained below. The ATM cell is transferred from the UTOPIA interface chip 16 to the STM interface chip, according to the UTOPIA interface standard. The STM interface chips 10 and 11 are duplexed, as shown in FIG. 1, to enhance the transmission reliability.

Communication of the control signals SOC, TCA, RCA, RXEN, and TXEN in the UTOPIA interface standard and the 8-bit data are carried out by the transmission buffer 12, reception buffer 13, and the STM interface chips 10 and 11. The transmission buffer 12 and reception buffer 13 open paths to the first STM interface chip 10 and close paths to the second STM interface chip 11, using the control signals in a normal state. In the normal state, if the first STM link (or the interface chip) fails during operation of the board, the first STM interface chip 10 issues an alarm. When the first STM interface chip 10 issues an alarm, links between the first STM interface chip 10 and the transmission buffer 12 and the reception buffer 13 are cut off, and links between the second STM interface chip 11 and the transmission and reception buffers 12 and 13 are formed.

The background art STM has the following problems. First, when data (or an ATM cell) is transferred from the UTOPIA interface chip to the STM interface chip, the data is transferred from the UTOPIA interface chip to one of the duplexed STM interface chips. Effective management of the duplexed STM interface chips is difficult because the STM chips are fixedly duplexed.

Second, when the UTOPIA interface chip receives data from the STM interface chip, since the bus-matching FIFO is required to receive the data from the STM interface through the reception buffer, the reception of data can be troublesome when the reception buffer fails.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Accordingly, the present invention is directed to a synchronous transport module (STM) that substantially obviates one or more of the problems due to limitations and disadvantages of the background art.

An object of the present invention is to provide a synchronous transport module, in which a plurality of STM links in a board are variably simplexed/duplexed.

To achieve these and other advantages and in accordance with the purpose of the present invention, as embodied and broadly described, the STM includes a UTOPIA interface chip for transmitting/receiving UTOPIA level-2 data; one pair of STM interface chips for receiving/transmitting UTOPIA level-1 data; a UTOPIA memory for converting UTOPIA level-2 data into UTOPIA level-1 data and transferring the UTOPIA level-1 data to one of the pair of STM interface chips, according to a transmission address; a first bus-matching memory for converting the UTOPIA level-1 data from a first STM interface chip, of the pair of STM interface chips, into UTOPIA level-2 data and transferring the converted UTOPIA level-2 data to the UTOPIA interface chip, according to a reception address; a second bus-matching memory for converting UTOPIA level-1 data from a second STM interface chip, of the pair of STM interface chips, into UTOPIA level-2 data and transferring the converted UTOPIA level-2 data to the UTOPIA interface chip, according to the reception address; a processor for reading states of the STM interface chips; and a UTOPIA interface control part for converting the transmission address and the reception address under the control of the processor.

The objects of the invention may be further achieved in whole or in part by a synchronous transport module (STM), including a plurality of STM interfaces that communicate universal test, operation, and physical interface for asynchronous transport mode (UTOPIA) level-1 data. A UTOPIA interface control communicates UTOPIA level-2 data and assigns an operational state and a communication mode to each of the plurality of STM interfaces. A plurality of bus-matching first in first out (FIFO) memories communicate the UTOPIA level-1 data with the plurality of STM interfaces and the UTOPIA level-2 data with the UTOPIA interface control part, convert the UTOPIA level-1 data to the UTOPIA level-2 data, and convert the UTOPIA level-2 data to the UTOPIA level-1 data. Each of the plurality of bus-matching FIFO memories corresponds to a separate one of the plurality of STM interfaces and communicates UTOPIA level-1 data with only the corresponding STM interface.

The objects of the invention may be further achieved in whole or in party by a synchronous transport module (STM) communication method, including communicating universal test, operation, and physical interface for asynchronous transport mode (UTOPIA) level-1 data between a plurality of STM interfaces and a plurality of bus-matching first in first out (FIFO) memories; communicating UTOPIA level-2 data between a UTOPIA interface control part and the plurality of bus-matching FIFO memories; and converting the UTOPIA level-1 data received by the plurality of bus-matching FIFO memories to the UTOPIA level-2 data, and converting the UTOPIA level-2 data received by the plurality of bus-matching FIFO memories to the UTOPIA level-1 data. Each of the plurality of bus-matching FIFO memories corresponds to a separate one of the plurality of STM interfaces and communicates UTOPIA level-1 data with only the corresponding STM interface.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
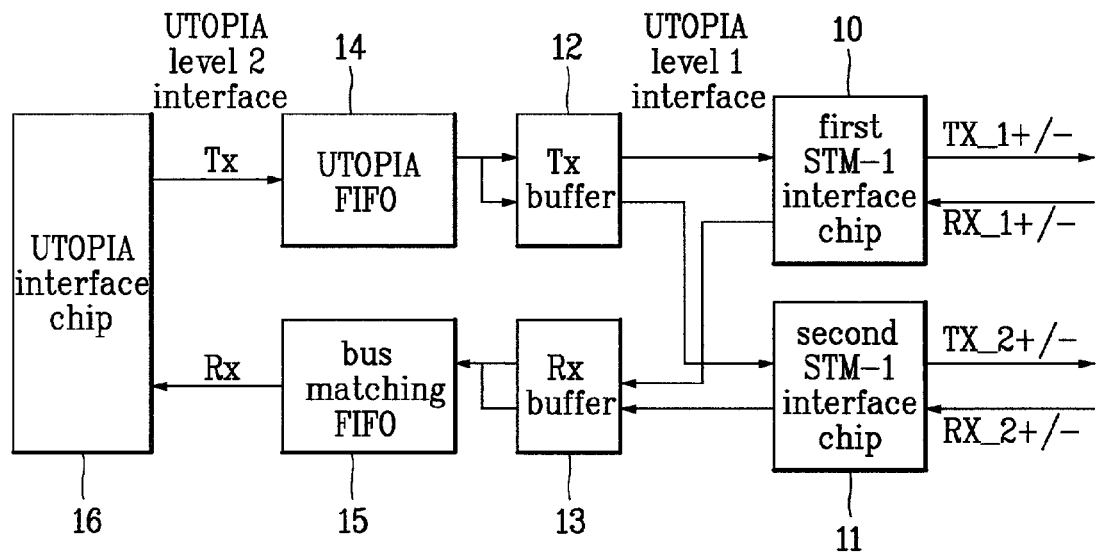
FIG. 1 illustrates a block diagram of a background art STM-1 port duplexing device.
Figure 2:
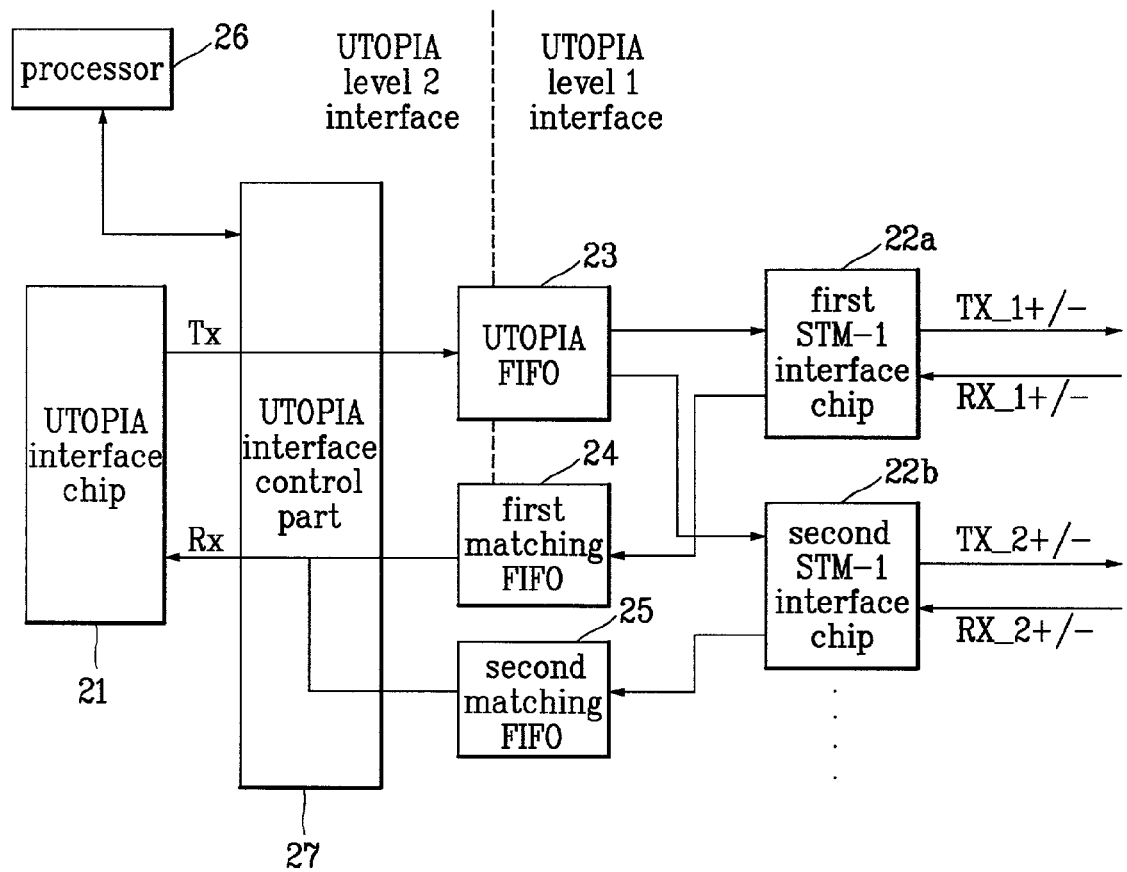
FIG. 2 illustrates a block diagram of an STM-1 port duplexing device in accordance with a preferred embodiment of the present invention.

FIG. 2 illustrates a block diagram of an STM in accordance with a preferred embodiment of the present invention, inclusive of duplexed ports at the UTOPIA interface level-1 interface. The STM includes a UTOPIA interface chip 21, one pair of STM interface chips 22a and 22b, a UTOPIA First In First Out (FIFO) memory 23, a first bus-matching FIFO memory 24, a second bus-matching FIFO memory 25, a processor 26, and a UTOPIA interface control part 27.

The UTOPIA interface chip 21 communicates UTOPIA level-2 data. The pair of STM interface chips 22a and 22b communicate UTOPIA level-1 data. Though the use of one pair of STM interface chips is described herein as an example, a plurality of pairs of the STM interface chips (for example, four pairs, eight pairs, and 16 pairs) may be used.

The UTOPIA FIFO memory 23 converts UTOPIA level-2 data into UTOPIA level-1 data and transmits the converted data to one of the pair of STM interface chips 22a and 22b, according to a transmission address. Though only one UTOPIA FIFO memory is used in this embodiment, a separate UTOPIA FIFO memory 23 is preferably used for each pair of STM interface chips.

The UTOPIA FIFO memory 23 converts UTOPIA level-2, 16-bit data, received from the UTOPIA interface control part 27, into UTOPIA level-1, 8-bit data and transmits the 8-bit data to one of the STM interface chips 22a and 22b. The first bus-matching FIFO memory 24 and the second bus-matching FIFO memory convert the UTOPIA level-1, 8-bit data, received from the STM interface chip 22a and the STM interface chip 22b, into UTOPIA level-2, 16-bit data and transmit the 16-bit data to the UTOPIA interface control part 27, respectively.

In other words, the first bus-matching FIFO memory 24 converts UTOPIA level-1 data received from the STM interface chip 22a into UTOPIA level-2 data, according to a received address, and forwards the converted data to the UTOPIA interface chip 21, through the UTOPIA interface control part 27. Similarly, the second bus-matching FIFO memory 25 converts UTOPIA level-1 data received from the STM interface chip 22b into UTOPIA level-2 data, according to a received address, and forwards the converted data to the UTOPIA interface chip 21 through the UTOPIA interface control part 27. Though the illustrated embodiment shows an STM having only two bus-matching FIFO memories 24 and 25, a separate pair of bus-matching FIFO memories 24 and 25 are preferably used for each STM interface chip 21 employed in the STM-1 port duplexing device.

The processor reads states of the STM interface chips 22a and 22b and controls the UTOPIA interface control part 27, according to a result of the read. The UTOPIA interface control part 27 converts the received address, under the control of the processor 26. That is, the UTOPIA interface control part 27 converts an address of the 16-bit data (or ATM cell), received from the UTOPIA interface chip 21, and forwards the converted address to the UTOPIA FIFO memory 23. The UTOPIA interface control part 27 also converts an address of the 16-bit data, received either from the first bus-matching FIFO memory 24 or the second bus-matching FIFO memory 25, and forwards the converted address to the UTOPIA interface chip 21.

Processes for transmitting data from the UTOPIA interface chip 21 to the STM interface chip 22a or 22b will be explained below. The UTOPIA interface chip 21 processes the ATM cell and provides the UTOPIA level-2 interface. The ATM cells (hereafter called 'data') transferred from the UTOPIA interface chip 21 to a plurality of STM interface chips, inclusive of the STM interface chip 22a and the STM interface chip 22b (all STM interface chips are not shown), have their own transmission addresses, respectively. Therefore, the data are transferred to one of the STM interface chips according to their respective transmission addresses.

If the transfer of 16-bit data to the addressed one of the STM interface chips (also called 'links') fails, the processor 26 detects the failed state. Then, the processor 26 instructs the UTOPIA interface control part 27 to convert the transmission address of the data received from the UTOPIA interface chip 21.

A process for converting the transmission address of the data will be explained, which is related to the duplexing of the STM interface chips. The present invention groups a plurality of the STM interface chips into at least one pair and manages the grouped STM interface chips. For example, suppose that 8 STM interface chips (i.e., 4 pairs of STM interface chips) are taken into account. In this instance, the UTOPIA interface control part 27 preferably has an 8-bit duplexing register. Of the 8-bits, 4 bits are used for determining whether each of the four pairs of STM interface chips is in a duplex state or a simplex state. The remaining four bits are used to determine whether each of the duplexed pairs of STM interface chips is in an active state or a standby state.

Assume the UTOPIA interface control part 27 is connected to 32 STM interface chips (or links), at the UTOPIA level-2 protocol, using a 5-bit transmission address. Four of the five bits select a particular one of the 32 possible destination addresses, corresponding to the 16 pairs of STM interface chips, and one bit selects which STM interface chip, of the addressed pair, to use. In this instance, the five-bit transmission address allocated to the data is transferred to the UTOPIA FIFO memory 23, through the UTOPIA interface control part 27. The UTOPIA FIFO memory 23 has a structure that maps each of the transmission addresses to its respective link. Therefore, the UTOPIA FIFO memory 23 communicates the transmission data only to the transmission address and transmits the ATM cell, from the UTOPIA interface chip 21, to the STM interface chip corresponding to the transmission address.

The UTOPIA interface control part 27 uses the transmission address as it is, or changes the transmission address to identify a redundant STM interface chip of a pair, depending on a state of the two STM interface chips 22a and 22b in one pair. If the STM interface chips are grouped into 16 pairs, the transmission address preferably can be changed only by changing a first bit of the 5-bit transmission address. The UTOPIA interface control part 27 changes the transmission address under the control of the processor 26 (e.g., a programmable logic device). For example, when the STM interface chip 22a of a number '0' link and the STM interface module 22b of a number '1' link are grouped in a first pair, the transmission address for the '0' number link is '00000' and the transmission address for the '1' number address is '00001'. When a number 2 link and a number 3 link are grouped as a second pair, the transmission address for the number 2 link is '00010' and the transmission address for the number 3 link is '00011'.

Assume that the first STM interface chip 22a and the second STM interface chip 22b, in the first pair, are a duplexed pair, and the third STM interface chip (not shown) and the fourth STM interface chip (not shown), in the second pair, are a simplexed pair. Further assume that the UTOPIA interface chip 21 logically transfers the ATM cell to the first STM interface chip 22a, the third STM interface chip (not shown), and the fourth STM interface chip (not shown). If the number '0' link (the first STM interface chip 22a) in the first pair fails, the first STM interface chip 22a issues an alarm, and the processor 26 reads the alarm state. Then, processor 26 sets the first STM interface chip 22a to a standby state and the second STM interface chip 22b to an active state, through the UTOPIA interface control part 27. Accordingly, the UTOPIA interface control part 27 inverts the first bit of the 5-bit transmission address, received from the UTOPIA interface chip 21, either from '0' to '1' or from '1' to '0', under the control of processor 26. Therefore, even if the UTOPIA interface chip 21 logically transmits the ATM cell on the $0^{th}$, the second, and the third links, the UTOPIA interface control part 27 physically transmits the ATM cell on the first, the second, and the third links by changing the transmission address, when a failure occurs in the $0^{th}$ link. By changing the transmission address, the first STM interface chip 22a and the second STM interface chip 22b, in the first pair, provide a duplexed effect.

A reception path Rx of the ATM cell, from the STM interface chips to the UTOPIA interface chip 21, will be explained.

Referring to FIG. 2, the number of STM interface chips are one-to-one matched to the number of bus-matching FIFO memories. For example, in FIG. 2, the first STM interface chip 22a is one-to-one matched with the first bus-matching FIFO memory 24 and the second STM interface chip 22b is one-to-one matched with the second bus-matching FIFO memory 25.

An ATM cell is transmitted to the first bus-matching FIFO memory 24, through the first STM interface chip 22a, and to the second bus-matching FIFO memory 25, through the second STM interface chip 22b. If the links (or chips) 22a and 22b in the first pair are set as a duplexed pair, in the 8-bit register of the UTOPIA interface control part 27, the ATM cell is transferred to the bus-matching FIFO memory corresponding to the active STM interface chip, but not to the bus-matching FIFO memory corresponding to the standby STM interface chip. The conversion of the reception address, when the ATM cell enters the UTOPIA interface chip 21 through the UTOPIA interface control part 27, is identical to the conversion of the transmission address along the transmission path.

As has been explained, the synchronous transport module of the present invention has the following advantages.

First, when data (or an ATM cell) is transferred from a UTOPIA interface chip at a UTOPIA level-2 to an STM interface chip at a UTOPIA level-1, a duplexed block of the STM interface chips (or links) can be provided, variably, to permit an effective management of the STM interface chips (or links).

Second, when data is transferred from the STM interface chip at the UTOPIA level-1 to the UTOPIA interface chip at the UTOPIA level-2, the one-to-one matching of the bus-matching FIFO memory and the STM interface chip makes duplexing/simplexing of the STM interface chips easy. Moreover, it copes with a failure in the STM interface chip, effectively.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A synchronous transport module (STM) comprising:
   a UTOPIA interface chip for transmitting a UTOPIA level 2 data;
   one pair of STM interface chips for receiving a UTOPIA level 1 data;
   a UTOPIA memory for converting the UTOPIA level 2 data into the UTOPIA level 1 data, and transferring the UTOPIA level 1 data to one of the pair of the STM interface chips according to a transmission address; and,
   a UTOPIA interface control part for converting the transmission address depending on states of the STM interface chips, the UTOPIA interface control part including bits which are used for determining whether the STM interface chips are to be in duplex states and/or simplex states, and other bits which are used for determining whether the respective STM interface chips are to be in active states and/or standby states in the duplexing.

2. A synchronous transport module as claimed in claim 1, wherein the UTOPIA memory is an FIFO memory.

3. A synchronous transport module as claimed in claim 1, wherein the UTOPIA interface control part converts the transmission address by putting the chip in a failed state into a standby state and the chip in a regular state into an active state.

4. A synchronous transport module as claimed in claim 3, wherein the conversion of the transmission address is inversion of a state of a least significant bit of the bits in the transmission address.

5. An synchronous transport module (STM) comprising:
   a UTOPIA interface chip for transmitting/receiving a UTOPIA level 2 data;
   one pair of STM interface chips for receiving/transmitting a UTOPIA level 1 data;
   a UTOPIA memory for converting the UTOPIA level 2 data into the UTOPIA level 1 data, and transferring the UTOPIA level 1 data to one of the pair of the STM interface chips according to a transmission address;
   a first bus matching memory for converting the UTOPIA level 1 data from a first STM interface chip of the pair of the STM interface chips into the UTOPIA level 2 data, and transferring the converted UTOPIA level 2 data to the UTOPIA interface chip according to a reception address;
   a second bus matching memory for converting the UTOPIA level 1 data from a second STM interface chip of the pair of the STM interface chips into the UTOPIA level 2 data, and transferring the converted UTOPIA level 2 data to the UTOPIA interface chip according to the reception address;
   a processor for reading states of the STM interface chips; and,
   a UTOPIA interface control part for converting the transmission address and the reception address under the control of the processor, the UTOPIA interface control part including bits which are used for determining whether the STM interface chips are to be in duplex states and/or simplex states, and other bits which are used for determining whether the respective STM interface chips are to be in active states and/or standby states in the duplexing.

6. An STM as claimed in claim 5, wherein the UTOPIA interface control part converts the transmission address and the reception address by putting the chip in a failed state into a standby state and the chip in a regular state into an active state.

7. An STM as claimed in claim 5, wherein the processor is a programmable logic device (PLD).

8. An STM as claimed in claim 5, wherein the UTOPIA memory, the first bus matching memory, and the second bus matching memory are first in first out (FIFO) memories.

9. A method for transmitting a data in an STM including a UTOPIA interface chip for transmitting a UTOPIA level 2 data having a transmission data, one pair of STM interface chips for receiving a UTOPIA level 1 data, a UTOPIA memory for converting the UTOPIA level 2 data into the UTOPIA level 1 data, and transferring the UTOPIA level 1 data to one of the pair of the STM interface chips according to the transmission address, and a processor, the method comprising:
   (a) checking fail states of the STM interface chips through the processor,
   (b) converting the transmission address by putting the chips in failed states to standby states, and the chips in regular states to active states, among the STM interface chips,
   (c) assigning each of the STM interface chips to operate in a duplex mode or a simplex mode, for the respective communication mode, and
   (d) assigning each of the STM interface chips the operational state of active state or standby state, based on an operational status of the respective STM interface chip
   (e) transmitting the converted UTOPIA level 1 data to the chips in the active state among the STM interface chips according to the transmission address.

10. A method as claimed in claim 9, wherein the processor is a programmable logic device (PLD).

11. A method as claimed in claim 9, wherein the conversion of the transmission address is inversion of a state of a least significant bit of the bits in the transmission address.

12. A synchronous transport module (STM), comprising:
   a plurality of STM interfaces that communicate universal test, operation, and physical interface for asynchronous transport mode (UTOPIA) level-1 data;
   a UTOPIA interface control part that communicates UTOPIA level-2 data and assigns an operational state and a communication mode to each of the plurality of STM interfaces; and
   a plurality of bus-matching first in first out (FIFO) memories that communicate the UTOPIA level-1 data with the plurality of STM interfaces and the UTOPIA level-2 data with the UTOPIA interface control part, convert the UTOPIA level-1 data to the UTOPIA level-2 data, and convert the UTOPIA level-2 data to the UTOPIA level-1 data, wherein
   each of the plurality of bus-matching FIFO memories corresponds to a separate one of the plurality of STM interfaces and communicates UTOPIA level-1 data with only the corresponding STM interface, wherein the UTOPIA interface control part assigns each of the plurality of STM interfaces to operate in a duplex mode or a simplex mode, for the respective communication mode, and assigns each of the plurality of STM interfaces the operational state of active state or standby state, based on an operational status of the respective STM interface.

13. The STM of claim 12, wherein:

each of the STM interfaces assigned the duplex mode of operation is paired with another STM interface and only one STM interface of each pair is assigned the active state; and only the active state STM interface, of each pair of STM interfaces, communicates with the UTOPIA interface control part.

14. The STM of claim 13, wherein the UTOPIA interface control part changes a portion of a destination address of the UTOPIA level-2 data to uniquely identify the one STM interface, of a particular pair of duplex mode STM interfaces that are both partially addressed by the destination address, that is currently assigned the active state.

15. The STM of claim 12, wherein each of the plurality of STM interfaces experiencing a detectable fault is assigned the standby state.

16. A synchronous transport module (STM) communication method, comprising:

communicating universal test, operation, and physical interface for asynchronous transport mode (UTOPIA) level-1 data between a plurality of STM interfaces and a plurality of bus-matching first in first out (FIFO) memories;

communicating UTOPIA level-2 data between a UTOPIA interface control part and the plurality of bus-matching FIFO memories;

converting the UTOPIA level-1 data, received by the plurality of bus-matching FIFO memories, to the UTOPIA level-2 data and converting the UTOPIA level-2 data, received by the plurality of bus-matching FIFO memories, to the UTOPIA level-1;

assigning each of the plurality of STM interfaces to operate in a duplex mode or a simplex mode of communication; and assigning each of the plurality of STM interfaces an operational state of active state or standby state, based on an operational status of the respective STM interface.

wherein each of the plurality of bus-matching FIFO memories corresponds to a separate one of the plurality of STM interfaces and communicates UTOPIA level-1 data with only the corresponding STM interface.

17. The method of claim 16, further comprising:

pairing each of the STM interfaces assigned the duplex mode of operation with another STM interface, wherein only one STM interface of each pair is assigned the active state, and only the active state STM interface, of each pair of STM interfaces, communicates with the UTOPIA interface control part.

18. The method of claim 17, further comprising changing a portion of a destination address of the UTOPIA level-2 data to uniquely identify the one STM interface, of a particular pair of duplex mode STM interfaces that are both partially addressed by the destination address, that is currently assigned the active state.

19. The method of claim 16, further comprising assigning each of the plurality of STM interfaces experiencing a detectable fault to the standby state.

* * * * *